United States Patent [19]

Sumiyoshi et al.

[11] Patent Number: 5,394,646
[45] Date of Patent: Mar. 7, 1995

[54] SYSTEM FOR AUTOMATICALLY CULTIVATING CROPS IN A GREENHOUSE

[75] Inventors: Yasuo Sumiyoshi; Masaaki Asazuma, both of Kobe; Nobuo Sakurai, Miki; Yoshinori Furukawa; Hisaaki Omoto, both of Kobe, all of Japan

[73] Assignee: Mitsuboshi Belting Ltd., Kobe, Japan

[21] Appl. No.: 113,850

[22] Filed: Aug. 27, 1993

Related U.S. Application Data

[62] Division of Ser. No. 661,912, Feb. 27, 1991, Pat. No. 5,303,505.

[30] Foreign Application Priority Data

Feb. 27, 1990 [JP] Japan .................................. 2-48795

[51] Int. Cl.⁶ .............................................. A01G 31/02
[52] U.S. Cl. .............................................. 47/58; 47/65
[58] Field of Search ............. 47/65, 65 D, 65 F, 58.01

[56] References Cited

U.S. PATENT DOCUMENTS 4,356,664 11/1982 Ruthner ................................. 47/65 D

FOREIGN PATENT DOCUMENTS

| 1441991 | 5/1966 | France ................................. 47/65 D |
| 1472285 | 3/1967 | France ................................. 47/65 D |
| 2846604 | 5/1979 | Germany ............................. 47/65 D |
| 6705946 | 10/1967 | Netherlands ........................ 47/65 D |
| 1102520 | 7/1984 | Russian Federation ........... 47/65 D |
| 1720593 | 3/1992 | Russian Federation ........... 47/65 D |

Primary Examiner—Henry E. Raduazo
Attorney, Agent, or Firm—Wood, Phillips, VanSanten, Clark & Mortimer

[57] ABSTRACT

A system for automatically cultivating crops, according to the present invention, consists of a first structure for conveying seedlings in a first predetermined path to allow the seedlings to be treated under a first set of controlled growing conditions, a second structure for conveying the seedlings in a second predetermined path to allow the seedlings to be treated under a second set of controlled growing conditions, and structure for selectively diverting conveying seedlings on the first conveying structure onto the second conveying structure for conveyance by the second conveying structure.

9 Claims, 4 Drawing Sheets

SYSTEM FOR AUTOMATICALLY CULTIVATING CROPS IN A GREENHOUSE

This is a division of application Ser. No. 07/661,912, filed Feb. 27, 1991, and now U.S. Pat. No. 5,303,505.

BACKGROUND OF THE INVENTION

1. Field of the Invention

This invention relates to crop cultivation and, more particularly, to a system for automatically introducing seedlings into a controlled environment, controllably conveying the seedlings through the controlled environment as treatment is effected thereon, and discharging the matured seedlings from the system.

2. Background Art

A multitude of crops are conventionally cultivated in the controlled environment of a greenhouse. Exemplary of the types of crop seedlings that are grown in this fashion are vegetables, root crops, fruits, petal-bearing plants, etc.

Heretofore, cultivation of these various crops in greenhouses has been accomplished by five different techniques: 1) a floor installation system; 2) a stationary bed system; 3) a movable bed system; 4) a chain conveying movable system; and 5) a special bed system. The prior systems and their various drawbacks will be explained below.

In the floor installation systems, master boxes, generally constructed from wood, are arranged in square or rectangular blocks directly on the floor of the greenhouse. A representative block of the master boxes may consist of ten such boxes. Within each of the master boxes are a plurality of individual plastic pots, typically on the order of 20, which contain the seedlings. The master boxes must be lifted and transported manually by the greenhouse operators/laborers.

One of the principal drawbacks with the floor installation systems is that they are very inefficient spacewise. For the seedlings to be accessible to the greenhouse operator, as to effect treatment thereof such as fertilizing and watering, it is necessary for paths to be provided around the boxes. Consequently, a substantial area of the otherwise usable greenhouse floor is dedicated solely to providing a pathway for the greenhouse operator/laborer tending to the growing seedlings.

A further problem with the floor installation systems is that they are normally completely manual systems. That is, the greenhouse operator/laborer manually sets up the boxes with the seedlings, conveys the boxes to different parts of the greenhouse at different stages of maturity for the seedlings, and manually transports the boxes, one by one, out of the greenhouse after the seedlings have adequately matured. Because the boxes are placed on the greenhouse floor, the operator is required to lean over to grasp and raise the boxes. Back pain and back injury for the greenhouse operators/laborers is common.

A still further problem with the floor installation systems is that their effective operation requires a large labor force. It is a labor intensive process to plant the seeds, move the seedlings, and effect conveyance of the boxes to the various parts of the greenhouses in which they are separately treated.

In the bed-type systems, the individual wooden boxes containing the pots are placed on a table, as opposed to the previously described floor installation system. The principal advantage of the table is that the boxes are at a more convenient working height and need not be elevated from ground level to effect conveyance thereof.

However, all of the other drawbacks of the floor installation system are present, i.e. the large space requirements, slow operation, inconvenience of manual setup and movement of the seedlings and the requirement of a large labor force.

The movable bed systems are similar to the table bed systems, described above, with the exception that groups of rollers are arranged on the table tops which allow the individual wooden boxes to be more easily slid along the tabletops by rotation of the rollers. This arrangement facilitates repositioning of the individual boxes and readily allows a working space to be developed around the individual boxes by simply relatively shifting the boxes through the roller system.

However, while movement of the individual boxes is facilitated, the entire system remains manual. Further, movement of the boxes onto the table, off of the table to separate locations in the greenhouse, and out of the greenhouse, is effected manually so that the system, while easier to operate than the above described systems, remains labor intensive and quite inefficient in terms of time and space.

In the chain conveyor systems, conveyors are arranged serially to transport seedlings through germinating greenhouses and cultivating greenhouses. A cultivating tray is contained in a case which is translated at slow speeds in a substantially straight path as the conveyor is operated.

In the special bed systems, seedlings are planted in openings within perforated panels, with the perforations arranged stereoscopically in a crescent shape. Nutrient solution is sprayed onto the seedlings to effect cultivation thereof.

The chain conveyor and special bed systems both require a substantial mount of manual labor.

All of the above systems require that the seedlings, at a certain stage of development, be spaced, each from the other, to avoid intermingling of the seedlings that would detrimentally alter the growth process. In each of the above systems, this process must be carried out manually.

The quality of the various crops is dependent heavily on the growing conditions. Crop quality varies depending on the amount of nutrients added, the condition of the air, the amount of sunshine, the ambient temperature and the amount of moisture to which the crops are subjected. Certain of these conditions are inherently different from one location to the next in a greenhouse. Consequently, with the above described systems, there typically is a significant difference in the quality of the crops from one location to the next in the greenhouse. This is a particularly undesirable problem that is contended with in the above prior art mass production systems.

SUMMARY OF THE INVENTION

The present invention is specifically directed to overcoming the above-enumerated problems in a novel and simple manner.

The principal objective of the present invention is to effect automatic cultivation of crops in a greenhouse through a simple system that works rapidly and efficiently to produce a homogeneous crop. At the same time, a high quality product is realized with a minimal amount of manual labor and with minimal space requirements.

The present invention contemplates both a system for automatically cultivating crops and a method of accomplishing the same.

The system, according to the present invention, consists of a first structure for conveying seedlings in a first predetermined path to allow the seedlings to be treated under a first set of controlled growing conditions, a second structure for conveying the seedlings in a second predetermined path to allow the seedlings to be treated under a second set of controlled growing conditions, and structure for selectively diverting conveying seedlings on the first conveying structure onto the second conveying structure for conveyance by the second conveying structure.

The above system is contemplated to be used in a greenhouse, wherein illumination, temperature, moisture, nutrition and the like are controllable. The conveying seedlings, which may be either continuously or intermittently moved, are uniformly treated so that a high quality homogeneous crop results.

In a preferred form, the second conveying structure is operated at a faster speed than the first conveying structure so that the seedlings placed on the second conveying structure are spaced, one from the other, so that there is no detrimental contact between the matured seedlings on the second conveying structure.

To further facilitate this spacing, the conveying surface defined by the second conveying structure is wider than the conveying surface defined by the first conveying structure. Still further, the diverting structure has a diverting conveying surface between the first and second conveying structures to allow lateral dispersion of the seedlings as they are delivered to the second conveying structure. This may be accomplished by diverting rollers which fan the seedlings out as they are deposited on the second conveying structure.

Preferably, at least one, and preferably both, of the first and second conveying structures are arranged to convey seedlings in a closed loop. This arrangement allows efficient utilization of the greenhouse space.

In a preferred form, at least one of the first and second conveying structures, and preferably both of the conveying structures, are each made up of a plurality of conveying sections, to include a first substantially straight conveying section with an input/output end and a second curved section with an output/input end arranged adjacent to the input/output end of the first conveying section with the second conveying section in its operative position, to permit seedlings to be transferred between the input/output end of the first straight conveying section and the output/input end of the second curved conveying section.

Still further, the invention contemplates structure for moving the second, curved conveying section relative to the first conveying section to an inoperative position to thereby expose the input/output end of the first straight conveying section for ready access thereto.

In a preferred form, the second conveying section is moved transversely to the length of the first conveying section between its operative and inoperative positions.

Still further, the present invention contemplates an extensible conveying section associated with the first conveying section at the input/output end thereof to facilitate transfer of seedlings between a location off of the first conveying structure and the first conveying structure.

Preferably, the seedlings conveying on at least one of the first and second conveying structures are controllably treated with at least one of light, heat, cooled air, moisture and nutrients.

In a preferred form, the first and second conveying structures have conveying surfaces each configured in an elliptical/oval shape, with the major axes of the ellipses aligned substantially parallel to each other and preferably in colinear relationship.

The first conveying structure defines a seedling growing line, with the second conveying structure defining a cultivating line. The major axis of the second conveying structure is preferably longer than the major axis of the first conveying structure so that the length and area of the conveying surface on the second conveying structure is greater than the length and area of the conveying surface on the first conveying structure to facilitate the aforementioned spacing of seedlings in both a lengthwise and lateral direction.

In a preferred form, there are third and fourth conveying structures configured respectively like the first and second conveying structures and the diverting structure is movable selectively between a) a first transfer position wherein it diverts conveying seedlings from the first conveying structure onto the second conveying structure and b) a second transfer position wherein it diverts conveying seedlings from the third conveying structure onto the fourth conveying structure.

Preferably, each of the first, second, third and fourth conveying structures has a straight conveying section with spaced ends with an extensible conveying section on at least one of the ends of each of the straight conveying sections. Each extensible conveying section, in an extended state, facilitates loading of seedlings onto and unloading of seedlings from the straight conveying section.

Preferably, there is also a curved conveying section which, in an operative position, is adjacent to one end of each of the straight conveying sections for transferring seedlings to/from the straight conveying sections, and structure is provided for moving the curved conveying sections to an inoperative position in which they do not interfere with the extensible sections on each of the conveying structures with the extensible sections in their extended states.

The invention also contemplates a conveying system for facilitating introduction of articles such as seedlings onto the system and diversion of articles such as seedlings off of the system. According to one form of the invention, this system consists of: a plurality of conveying sections defining a conveying surface, with there being a straight conveying section and a curved conveying section, with the former having an input/output end and the latter having an output/input end to effect article transfer with the input/output end of the straight conveying section with the curved conveying section and the straight conveying section in their operative positions; and structure for moving one of the straight and curved conveying sections relative to the other of the straight and curved conveying sections to an inoperative position to expose at least one of the input/output end of the straight conveying section and output/input end of the curved section to facilitate loading of articles onto and unloading of articles from the conveying system.

Preferably, an extensible conveying section is provided at one of the input/output end of the straight conveying section and the output/input end of the curved conveying section.

The extensible section is selectively placed in a) a retracted condition in which it does not extend beyond the input/output end of the straight conveying section and b) an extended position in which the extensible section extends beyond the inlet/outlet end of the straight conveying section.

Preferably, the extensible section is substantially straight and in the line of the straight conveying section with the extensible section in its extended state.

In a preferred form, the straight conveying section communicates articles with curved conveying sections at each of its ends, with an extensible conveying section provided at each end.

The invention also contemplates a diverting structure for effecting transfer of articles in a straight conveying section.

In a preferred form, the conveying system has a second straight conveying section that is parallel to and co-extensive with the first straight conveying section with there being curved conveying sections interconnecting the ends of the straight conveying sections to thereby define a continuous path for conveying articles.

Preferably, each of the curved conveying sections is arcuate and extends through approximately 180°.

The present invention also contemplates a method of cultivating crops, including the steps of providing a first conveying structure, conveying seedlings on the first conveying structure in a first predetermined path to allow the seedlings to be treated under a first set of controlled growing conditions, providing a second conveying structure, transferring seedlings from the first conveying structure to the second conveying structure, and conveying seedlings on the second conveying structure in a second predetermined path to allow the seedlings to be treated under a second set of controlled growing conditions.

In a preferred form, a diverting structure is provided and transfer of the seedlings is effected from the first conveying structure to the second conveying structure automatically through the diverting structure.

Preferably, at least one of the first and second conveying structures can be reconfigured to facilitate a) the transfer of seedlings from the first conveying structure to the diverting structure and b) the transfer of seedlings from the diverting structure to the second conveying structure. This is preferably accomplished by constructing each of the first and second conveying structures with cooperating conveying sections, with at least one of the conveying sections having an extensible conveying section associated therewith, as in the structure previously described. One of the cooperating conveying sections is preferably moved relative to the other before placing the extensible section in its extended state.

Preferably, third and fourth conveying structures are provided, corresponding to the first and second conveying structures, and a diverting structure is provided and is relatively movable between a) a first transfer position to effect transfer of articles from the first conveying structure to the second conveying structure and b) a second transfer position to effect transfer of articles form the third conveying structure to the fourth conveying structure.

The invention also contemplates a method of transferring articles, such as seedlings, to and from a conveying structure, which method consists of the steps of: providing a plurality of article conveying sections cooperatively defining a conveying surface for articles, with there being one conveying section with an input/output end and a second conveying section, with the first and second conveying sections being relatively positionable in an operative position wherein articles from the input/output end of the first conveying section can be transferred to and from the first conveying section; and relatively moving the first and second conveying sections out of their operative position to facilitate access to the input/output end of the first conveying section for facilitated transfer of articles to and from the input/output end of the first conveying section.

Preferably, an extensible conveying section is provided at the input/output end of the first conveying section and is movable between retracted and extended positions so that the extensible section can be situated in its extended state only after the first and second conveying sections are moved out of their operative position.

DETAILED DESCRIPTION OF THE DRAWINGS

Figure 1:
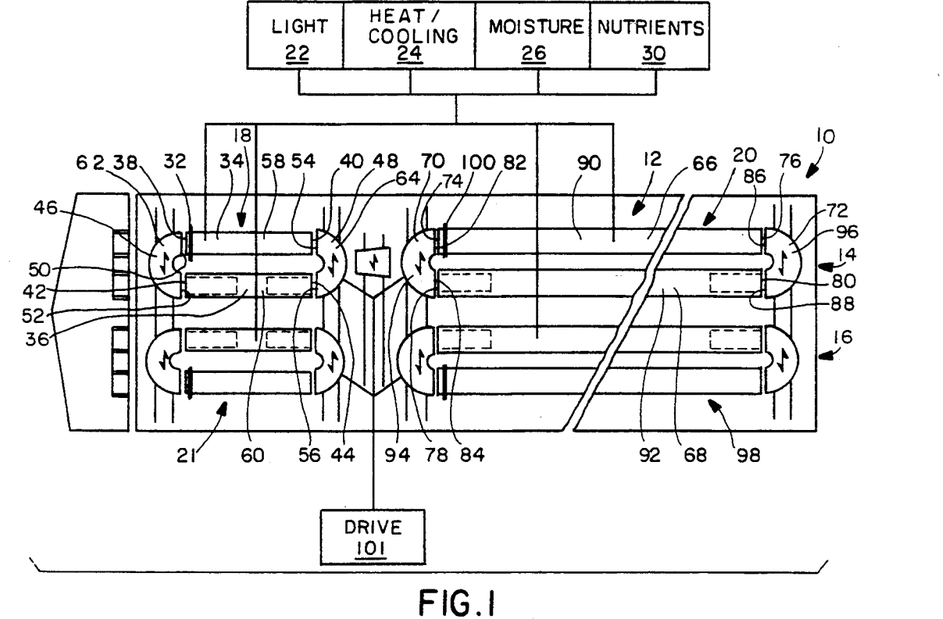
FIG. 1 is a plan view of a system for automatically cultivating crops in a greenhouse according to the present invention and including two seedling growing conveying structures on the left hand side of FIG. 1 and two cultivating conveying structure on the fight hand side of FIG. 1.

In FIG. 1, a greenhouse is shown at 10 with a crop cultivating system, according to the present invention, shown therewithin and generally at 12. The greenhouse 10 has a generally rectangular configuration to accommodate upper and lower cultivating lines 14, 16, respectively. Each cultivating line 14, 16 operates in the same manner, and thus description herein will be limited primarily to upper cultivating line 14.

The upper cultivating line 14 consists of seedling growing conveying structure at 18 and a cultivating conveying structure at 20. Seedlings (not shown in FIG. 1) are introduced to the conveying structure 18 in individual containers (not shown) and, while being conveyed in a continuous elliptical path, are exposed to a first controlled environment in a treatment zone 21 on the left hand side of the greenhouse 10. Means are provided to control the exposure of the seedlings to light and moisture and to further control the air temperature within the zone 21 within which the seedling growing conveyor 18 is operated. The light, heat/cooling, and moisture controlling means are shown schematically at 22, 24 and 26, respectively, in FIG. 1. Means 30 are also provided to treat the individual seedlings with nutrients, such as manure and other types of fertilizer, as at an exemplary location 32 in FIG. 1.

The seedling growing conveying section 18 is made up of four elements: first and second parallel, coextensive straight conveying sections 34, 36 with spaced ends 38, 40 and 42, 44, respectively; and curved/arcuate conveying sections 46, 48 at the ends of the conveying structure 18. The conveying section 46 extends through approximately 180° and has ends 50, 52, which are alignable in close proximity to the ends 38, 42, respectively, on the straight conveying sections 34, 36. The curved/arcuate conveying section 48 has similar ends 54, 56 alignable in close proximity to the opposite ends 40, 44 of the straight conveying sections 34, 36, respectively.

The conveying sections 34, 36, 46, 48 have flat conveying surfaces 58, 60, 62, 64, respectively, which cooperatively define a continuous, elliptical conveyance path for seedlings on the conveying structure 18. The conveying seedlings transfer from one conveying section 34, 36, 46, 48 to the next to move in the endless path.

Once the seedlings have matured to a predetermined stage, the seedlings are transferred to the cultivating conveying structure 20. The conveying structure 20 is defined by cooperating sections 66, 68, 70, 72. The sections 66, 68 are straight, parallel and coextensive, such as the corresponding sections 34, 36 on the seedling growing conveying structure 18. The straight conveying section 66 has spaced ends 74, 76 and the straight conveying section 68 corresponding ends 78, 80.

The curved conveying section 70 has spaced ends 82, 84 which, with the section 70 in its operative position of FIG. 1, align respectively with ends 74, 78 on the straight sections 66, 68, respectively. Curved element 72 has ends 86, 88 which align with ends 76, 80 on the straight conveying sections 66, 68, respectively, with the section 72 in its operative position of FIG. 1.

The conveying sections 66, 68, 70, 72 have upwardly facing conveying surfaces 90, 92, 94, 96, which cooperatively define an elliptical, endless path to convey seedlings. During the conveyance of seedlings on the cultivating conveying structure 20, the seedlings are subjected to a controlled environment in the zone 98 on the right hand side of the greenhouse 10.

Light, heat/cooling, and moisture are controlled through the means 22, 24, 26, respectively, in the zone 98. Nutrients are added to the seedlings, as at the location 100 on the conveying structure 20, through the means 30.

In operation, seedlings are introduced serially onto the conveying structure 18 and are subjected to a controlled environment and nourished in a prescribed manner. The conveying structures are driven either continuously or intermittently by a drive means 101 therefor. Because the seedlings are moved by the conveying structure 18, they are not maintained at any location wherein conditions i.e. light, heat, etc. might be different than for those experienced by other seedlings, as commonly occurs in the prior art systems earlier described. Homogeneous seedling growth results. Once the seedlings have matured to a predetermined point, they are transferred to the cultivating conveying structure 20 and again subjected to a controlled environment and nourished to promote optimum growth.

Again, the conveyance of the maturing seedlings on the conveying structure 20 prevents any difference in treatment for any of the seedlings on the conveying structure 20, which results in a consistently high quality yield. Once the seedlings have matured to a predetermined stage on the cultivating conveying structure 20, they are transferred off of the conveying structure 20 to a suitable collection point.

Further details of the operation of the present invention are explained with respect to FIGS. 2–6.

Figure 2:
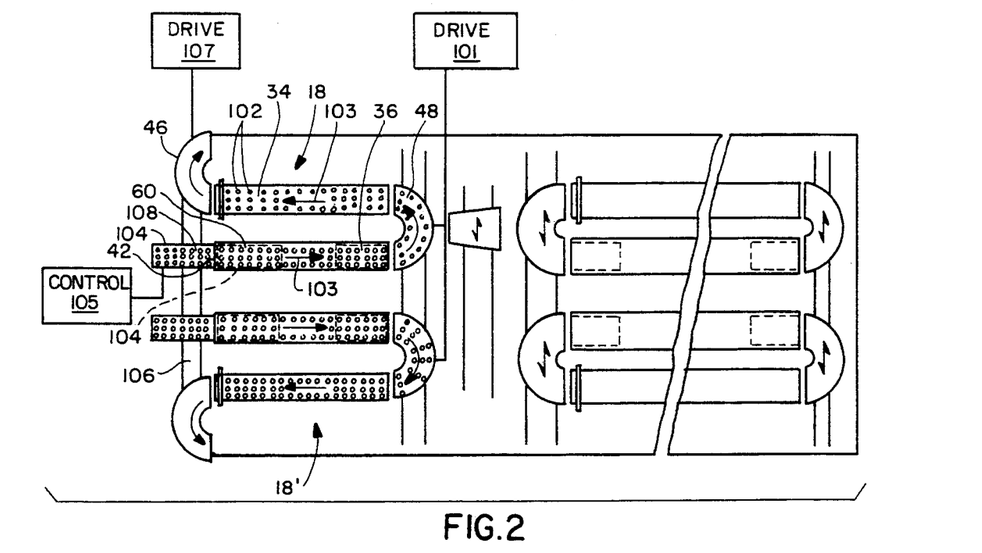
FIG. 2 is a plan view of the system in FIG. 1 showing the seedling growing conveying structures configured in a loading state in which seedlings can be conveniently delivered from a supply to the seedling growing conveying structures.

In FIG. 2, the seedling conveying structure 18 and the corresponding seedling conveying structure 18', therebeneath, are shown in a loading state. The loading state will be described only with respect to representative conveying structure 18.

In normal operation, the drive means 101 operates the conveying sections 34, 36, 46, 48 to convey the seedlings 104 regularly arranged thereon, in a counterclockwise direction around the elliptical path defined by the conveying structure 18, as indicated by arrows 103.

To facilitate loading of the seedlings 102 onto the conveying structure 18, the straight conveying section 36 is provided with an extensible conveying section 104. The conveying section 104 is selectively movable through a control 105 between a) a retracted position, shown in dotted lines in FIG. 2, wherein it underlies the conveying surface 60 on the conveying section 36, and b) an extended position, wherein it projects lengthwise in the line of the straight section 36, outwardly towards the left in FIG. 2, as shown in solid lines.

Before the section 104 can be extended to the FIG. 2 position, it is necessary to shift the curved conveying section 46 out of the path of extension of the extensible section 104 to its inoperative position shown in FIG. 2. This is accomplished by providing a guide rail 106 extending transversely of the length of the conveying section 36. A drive means 107 moves the conveying section 46 from its operative position, shown in FIG. 1, to the inoperative position of FIG. 2, wherein the conveying section 46 is repositioned to expose the end 42 of the conveying section 46 to allow unimpeded extension of the section 104.

The extensible section 104 is made up of a belt which is folded into its retracted position. The control 105 moves a frame (not shown) which unfolds the belt and directs it into the solid line position of FIG. 2. The conveying section 18 is then in a state to facilitate its loading.

With the conveying section 18 in its loading state, the individual seedlings 102 can be loaded onto an upwardly facing conveying surface 108 on the extensible section 104 for conveyance consecutively by the conveying sections 36, 48, 34, 46 until the upwardly facing conveying surface defined by the conveying structure 18 is filled with seedlings 102. Once this has occurred, the extensible section 104 is retracted to the dotted line position of FIG. 2, through the control 104, after which the curved end conveying section 46 is translated by the drive 107 back to its operative position.

Figure 3:
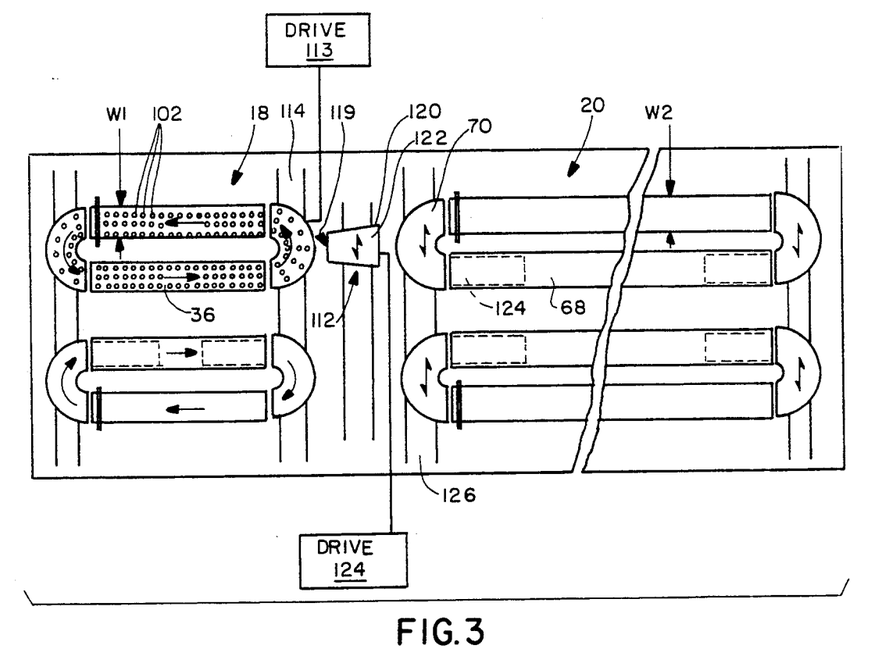
FIG. 3 is a view as in FIG. 2 showing the seedling growing conveying structures in their operative state and with seedlings thereon.

The operative position for the conveying structure 18 is shown in FIG. 3 with the seedlings 102 fully loaded thereon.

Figure 4:
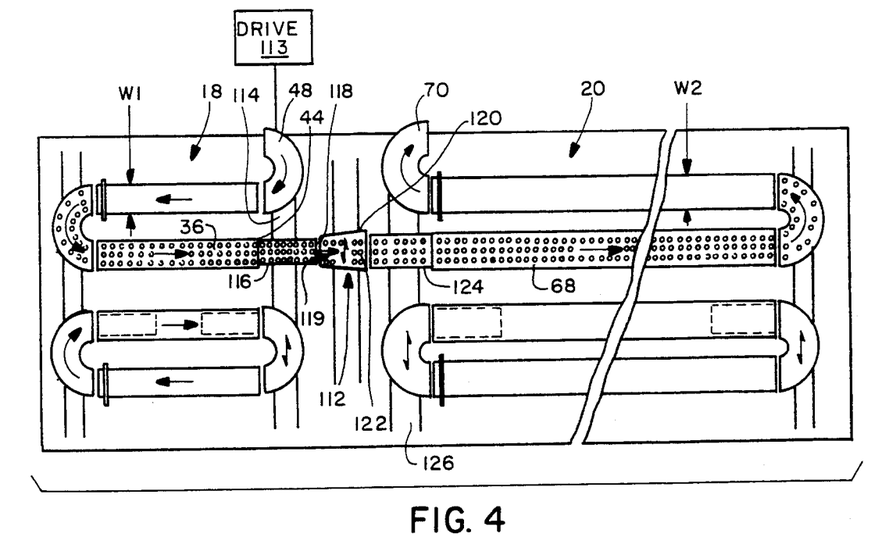
FIG. 4 is a plan view of the system in FIG. 1 showing the upper seedling growing conveying structure and cultivating conveying structure in a transfer state for transferring matured seedlings from the seedling growing conveying structure to the cultivating conveying structure.

Once the seedlings 102 on the conveying structure 18 have matured to a predetermined stage, the matured seedlings 102 are conveyed off of the conveying structure 18 and transferred to the cultivating conveyor system 20 through a diverting/spacing means 112, shown in FIGS. 3 and 4.

To effect this transfer, the conveying section 48 is first moved from its operative position of FIG. 2 to its inoperative position in FIG. 4 by a drive means 113. The conveying section 48 is translatable by the drive means 113 along a guide rail 114, extending substantially perpendicular to the length of the conveying section 36 to expose the end 44 of the conveying section 36.

An extensible conveying section 116 is provided at the end 44 of the conveying section 36 and is extendable and retractable in the same fashion as the previously described extensible section 104, with the only difference being that the section 116 is extended outwardly from the section 36 to the right in FIG. 4. This places the free end 118 in confronting relationship with an input edge 119 on a transfer shuttle 120.

The transfer shuttle 120 has a conveying belt 122 thereon which is operated by a drive 124 (FIG. 3) to transfer seedlings 102 to an extensible conveying section 124, operatively associated with straight conveying section 68 on the conveying structure 12, which is in linear alignment with the straight section 36. The seedlings 102 are continuously transferred from the conveying section 116 to the transfer shuttle 120 and in turn to the extensible conveying section 124 and onto the straight conveying section 68. The curved section 70 is moved from its operative position of FIG. 3 to its inoperative position of FIG. 4 along a guide rail 126, parallel to the longitudinal extent of rail 114 before the extensible section 124 can be moved from its retracted position of FIG. 3 to its extended position of Fig. 4 in which transfer between the conveying structures 18, 20 can be accomplished.

The drive means 101 for the conveying structure 18 drives the conveying surfaces 58, 60, 62, 64 at a faster rate than the conveying surfaces 90, 92, 94, 96 on the conveying structure 20 so that the seedlings transferred onto the conveying structure 12 are caused to be spaced from each other in a lengthwise feed direction to avoid contact between seedlings 102 on the conveying structure 20 that would otherwise be detrimental to the growth of the seedlings 102.

To permit spacing of the seedlings 102 laterally as well as in the lengthwise direction, the width W2 (FIGS. 3 and 4) of the conveying surfaces 90, 92, 94, 96 on the conveying section 20 is greater than the width W1 (FIGS. 3 and 4) of the conveying surfaces 58, 60, 62, 64 on the conveying structure 18.

The downstream end 130 (FIG. 5) of the transfer shuttle 120 is wider than the input end 118 thereon to allow fanning out of the seedlings 102 as they are delivered to the conveying structure 20. The invention also contemplates the use of rollers (not shown) on the transfer shuttle 120 with non-parallel rotational axes to laterally spread out the seedlings 102 delivered to the conveying structure 20.

Figure 5:
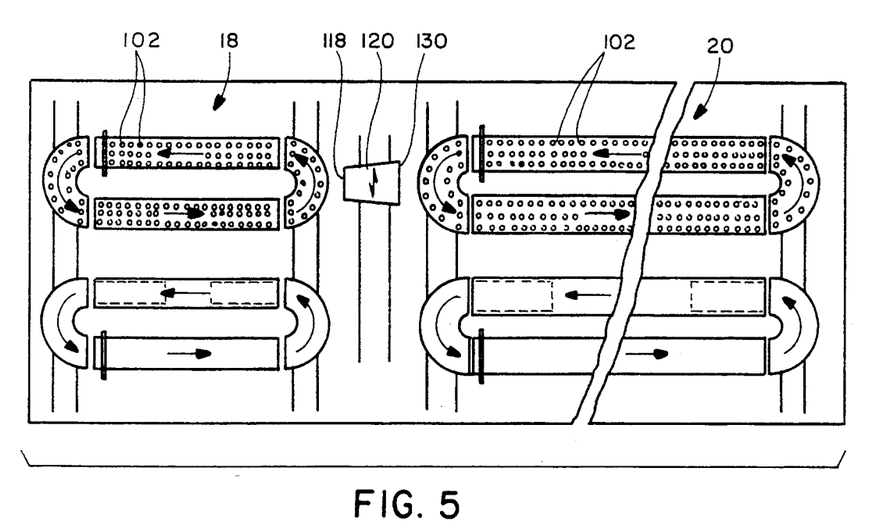
FIG. 5 is a view as in FIG. 4 with the upper seedling growing and cultivating conveying structures in their normal operating state.
Figure 6:
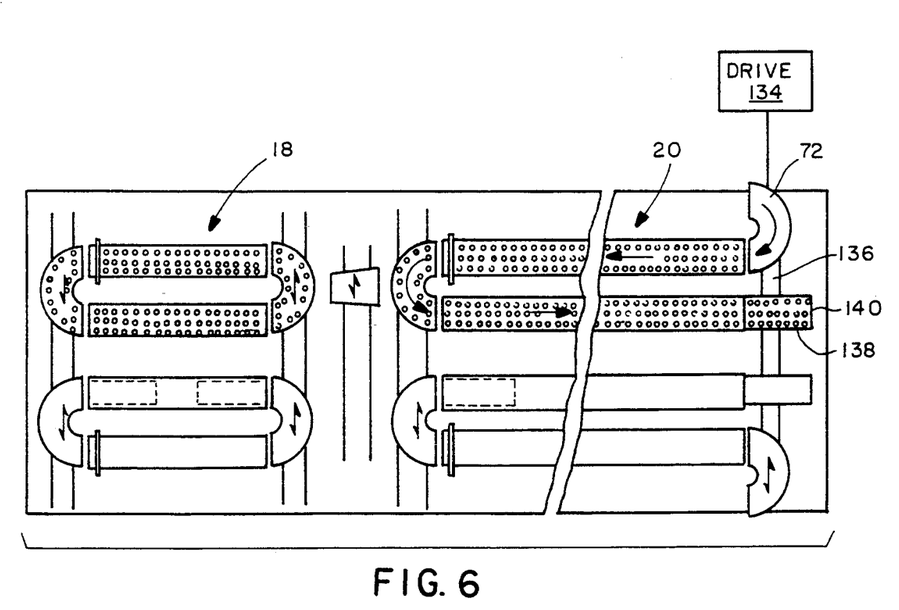
FIG. 6 is a plan view as in FIGS. 4 and 5 with the upper cultivating conveying structure configured in its unloading state to allow discharge of the matured crops to a desired point of use.

Once the transfer of the seedlings 102 is effected between the conveying structures 18, 20, the extensible sections 116, 124 are retracted and the sections 48, 70 replaced to their operative positions, as seen in FIG. 5. In FIG. 5, seedlings 102 are loaded on both conveying structures 18, 20.

Once the crops have sufficiently matured, they are transferred out of the greenhouse 10. To facilitate discharge of the seedlings 102 off of the conveying structure 20, the conveying section 72 is moved from its operative position of Fig. 5 to its inoperative position of FIG. 6 through a drive means 134 guidingly along a rail 136. An extensible conveying section 138, similar in operation to the extensible sections 104, 116, 124, previously described, is projected outwardly to the right in FIG. 6. By continuing operation of the conveying structure 20, the seedlings 102 are driven serially to the discharge end 140 of the conveying section 138 to facilitate their removal from the conveying structure 20. The adjacent conveying structures 18', 20' operate in the same manner as the conveying structures 18, 20. It can be seen that the major axes for the elliptical conveying path defined by the conveying structures 18, 20 and 18' 20', are substantially aligned. This facilitates in-line transfer between the conveying section 36 and conveying section 68 (See FIG. 4).

Figure 7:
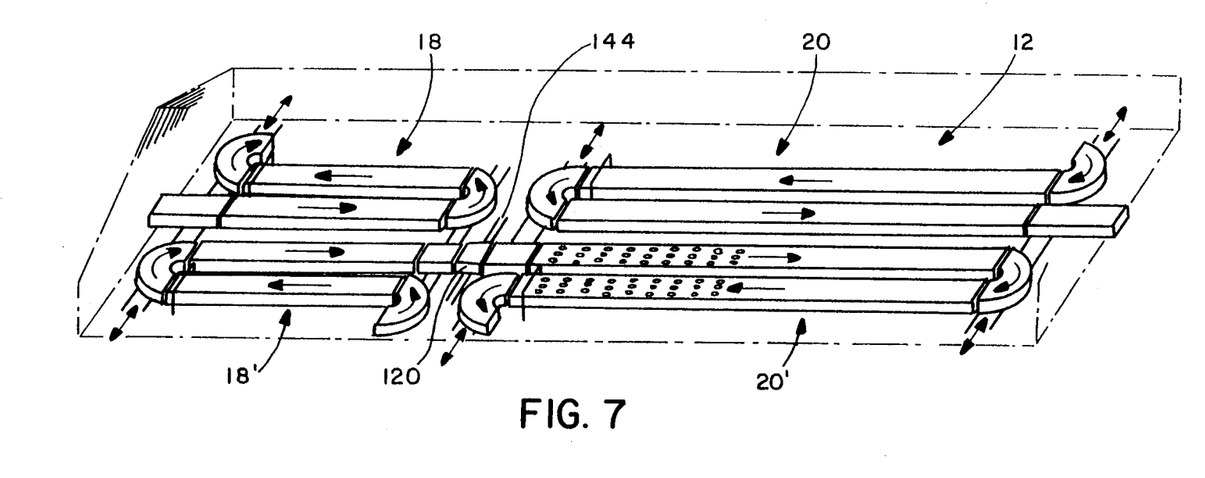
FIG. 7 is a perspective view of a system as in FIGS. 1-6 and showing the upper seedling growing conveying structure in its loading state, the upper cultivating conveying structure in its unloading state and the lower seedling growing and cultivating conveying structures in their transfer states.
Figure 8:
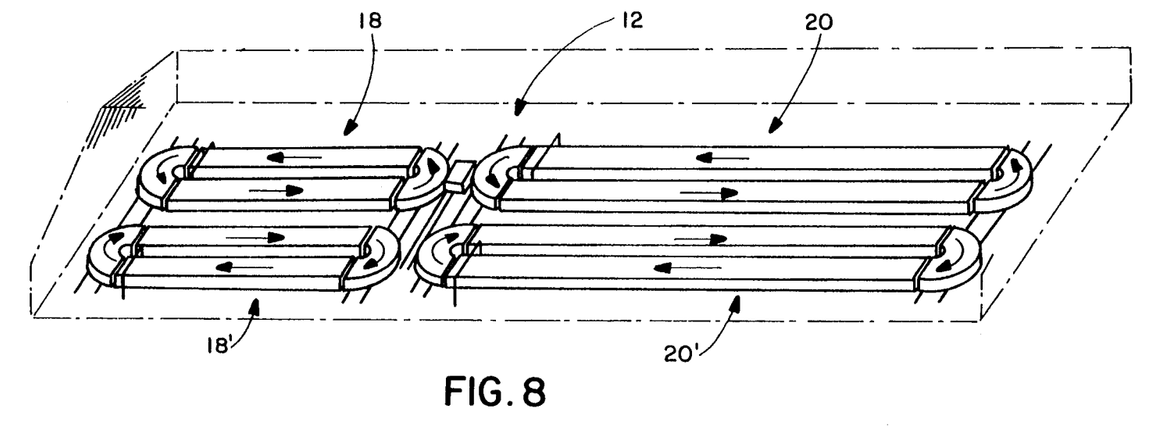
FIG. 8 is a view as in FIG. 7 with all of the conveying structures in a normal operating state in which seedlings can be continuously and intermittently conveyed in an elliptical path on their respective conveying structures.

In FIGS. 7 and 8, the conveying structures 18, 18' 20, 20' are shown in different states, with any combination of these states contemplated within the system 12. In FIG. 7, the conveying structure 20 is shown in its unloading state, corresponding to its position in FIG. 6. The conveying structure 18 is shown in FIG. 7 in its loading state, corresponding to that in FIG. 2. The conveying structures 18', 20' in FIG. 7 are shown in a transfer state, corresponding to the position of the conveying structures 18, 20 in FIG. 4.

The transfer shuffle 120 is translatable along a guide element 144 by the drive 124 between a first transfer position, shown in each of FIGS. 1–6, and a second transfer position shown in FIG. 7. In the FIG. 7 position, transfer is effected between the conveying structures 18', 20' through the transfer shuttle 120 in the same manner as the transfer shuttle 120 effects transfer between the conveying structures 18, 20 in FIG. 4.

In FIG. 8, each of the conveying structures 18, 18', 20, 20' is shown in its normal operating position. As previously indicated, the conveying structures 18, 18', 20, 20' may be continuously operated at a slow speed as the seedlings 102 are watered and fertilized, or this conveyance may occur intermittently.

The foregoing disclosure of specific embodiments is intended to be illustrative of the broad concepts comprehended by the invention.

We claim:

1. A method of cultivating crops comprising the steps of:

providing a first means for conveying seedlings in a first predetermined, endless path with the first conveying means in a first state to allow the seedlings to be treated under a first set of controlled growing conditions;

providing a second means for conveying seedlings in a second predetermined, endless path with the second conveying means in a first state;

reconfiguring at least one of the first and second conveying means to a second state;

operating the first and Second conveying means with the at least one of the first and second conveying means reconfigured to its second state to thereby transfer seedlings from the first conveying means to the second conveying means; and conveying seedlings on the second conveying means in a second predetermined path to allow the seedlings to be treated under a second set of controlled growing conditions.

2. The method according to claim 1 including the steps of providing a diverting means and effecting transfer of the seedlings from the first conveying means to the second conveying means automatically through the diverting means.

3. The method according to claim 2 including the steps of providing third and fourth conveying means and moving the diverting means selectively between a) a first transfer position to effect transfer of articles from the first conveying means to the second conveying means and b) a second transfer position to effect transfer of articles from the third conveying means to the fourth conveying means.

4. The method according to claim 1 wherein there is no overlap between the first and second predetermined paths.

5. The method according to claim 1 including the step of intermittently operating at least one of the first and second conveying means as the seedlings are conveyed during treatment on the first and second conveying means.

6. A method of cultivating crops comprising the steps of:

providing a first means for conveying seedlings in a first predetermined path to allow the seedlings to be treated under a first set of controlled growing conditions;

providing a second conveying means;

transferring seedlings from the first conveying means to the second conveying means;

conveying seedlings on the second conveying means in a second predetermined path to allow the seedlings to be treated under a second set of controlled growing conditions;

providing a diverting means and effecting transfer of the seedlings from the first conveying means to the second conveying means automatically through the diverting means; and reconfiguring at least one of the first and second conveying means to facilitate at least one of a) the transfer of seedlings from the first conveying means to the diverting means and b) the transfer of seedlings from the diverting means to the second conveying means, wherein the one of the first and second conveying means has a first and a second cooperating conveying section and further including the step of providing an extensible conveying section, capable of being situated selectively in extended and retracted positions, on the first cooperating conveying section and reconfiguring the one of the first and second conveying means by placing the extensible conveying section in its extended state to place a part of the extensible section in close proximity to the diverting means.

7. The method according to claim 6 including the step of moving the first cooperating conveying section relative to the second cooperating conveying section before placing the extensible section in its extended state.

8. A method of transferring articles such as seedlings to and from a conveying structure, said method comprising the steps of:

providing a plurality of article conveying sections cooperatively defining a surface for conveying articles continuously in an endless path, there being one conveying section with an input/output end and a second conveying section, said first and second conveying sections being positionable in an operative position wherein articles from the input/output end of the first conveying section can be transferred to and from the first conveying section; and relatively moving the first and second conveying sections out of their operative position to thereby interrupt the continuous conveying path and expose the input/output end of the first conveying section to allow an operator to stand in the path of conveying articles on the first conveying section for facilitated transfer of articles to and from the end of the first conveying section.

9. The method according to claim 8 including the steps of providing an extensible conveying section at the end of the first conveying section that is movable between retracted and extended positions and situating the extensible section in its extended state after the first and second conveying sections are moved out of their operative positions.

* * * * *